US011891194B1

(12) United States Patent
Baderman et al.

(10) Patent No.: US 11,891,194 B1
(45) Date of Patent: Feb. 6, 2024

(54) REDUNDANT BATTERY MANAGEMENT SYSTEMS TO ENSURE SAFE OPERATIONS OF AERIAL VEHICLES

(71) Applicant: Amazon Technologies, Inc., Seattle, WA (US)

(72) Inventors: Hillel Moshe Saul Baderman, London (GB); Ben Martin Schweitzer, Seattle, WA (US); Joseph Rutland, Norfolk (GB); Sergey Andreev, Bothell, WA (US)

(73) Assignee: Amazon Technologies, Inc., Seattle, WA (US)

( * ) Notice: Subject to any disclaimer, the term of this patent is extended or adjusted under 35 U.S.C. 154(b) by 636 days.

(21) Appl. No.: 16/864,701

(22) Filed: May 1, 2020

(51) Int. Cl.
- *B64F 5/60* (2017.01)
- *B60L 58/10* (2019.01)
- *B60L 3/00* (2019.01)
- *H02J 7/00* (2006.01)

(52) U.S. Cl.
CPC .............. *B64F 5/60* (2017.01); *B60L 3/0084* (2013.01); *B60L 58/10* (2019.02); *H02J 7/0048* (2020.01)

(58) Field of Classification Search
CPC .......... B64F 5/60; B60L 3/0084; B60L 58/10; H02J 7/0048
See application file for complete search history.

(56) References Cited

U.S. PATENT DOCUMENTS

| | | | |
|---|---|---|---|
| 2019/0036178 A1* | 1/2019 | Karner | H02J 7/0047 |
| 2020/0036056 A1* | 1/2020 | Thomas | H02J 7/342 |
| 2021/0288511 A1* | 9/2021 | Fujita | H01M 10/425 |

* cited by examiner

Primary Examiner — James M McPherson
Assistant Examiner — Kyle J Kingsland
(74) Attorney, Agent, or Firm — Athorus, PLLC

(57) ABSTRACT

Systems and methods related to redundant battery management systems (BMS) may include an on-battery BMS, and one or more off-battery, off-vehicle, and/or remote BMS. The one or more remote BMS may receive data associated with parameters of a battery, and may process the received data using various models, algorithms, or estimators to determine a battery state. The battery state determined by the remote BMS may then be used to corroborate or support a battery state determined by the on-battery BMS, thereby ensuring safe, reliable, and efficient operations of systems, machines, or devices utilizing batteries as power sources.

20 Claims, 8 Drawing Sheets

REDUNDANT BATTERY MANAGEMENT SYSTEMS TO ENSURE SAFE OPERATIONS OF AERIAL VEHICLES

BACKGROUND

Batteries are increasingly used in vehicles, such as electric automobiles and aerial vehicles, including autonomous or unmanned aerial vehicles. When a battery is used as a primary power source for a vehicle, machine, or system, it is desirable to understand states of charge, health, and/or power of the battery to ensure safe, reliable, and efficient operations of the vehicle, machine, or system. Generally, such systems may include a single battery management system associated with the battery to determine states of charge, health, and/or power of the battery, such that the single battery management system may constitute a single point of failure. Accordingly, there is a need for systems and methods related to off-battery, redundant, and/or remote battery management systems to corroborate or support the single, on-battery battery management system, to ensure safe, reliable, and efficient operations of such systems.

DETAILED DESCRIPTION

Figure 1:
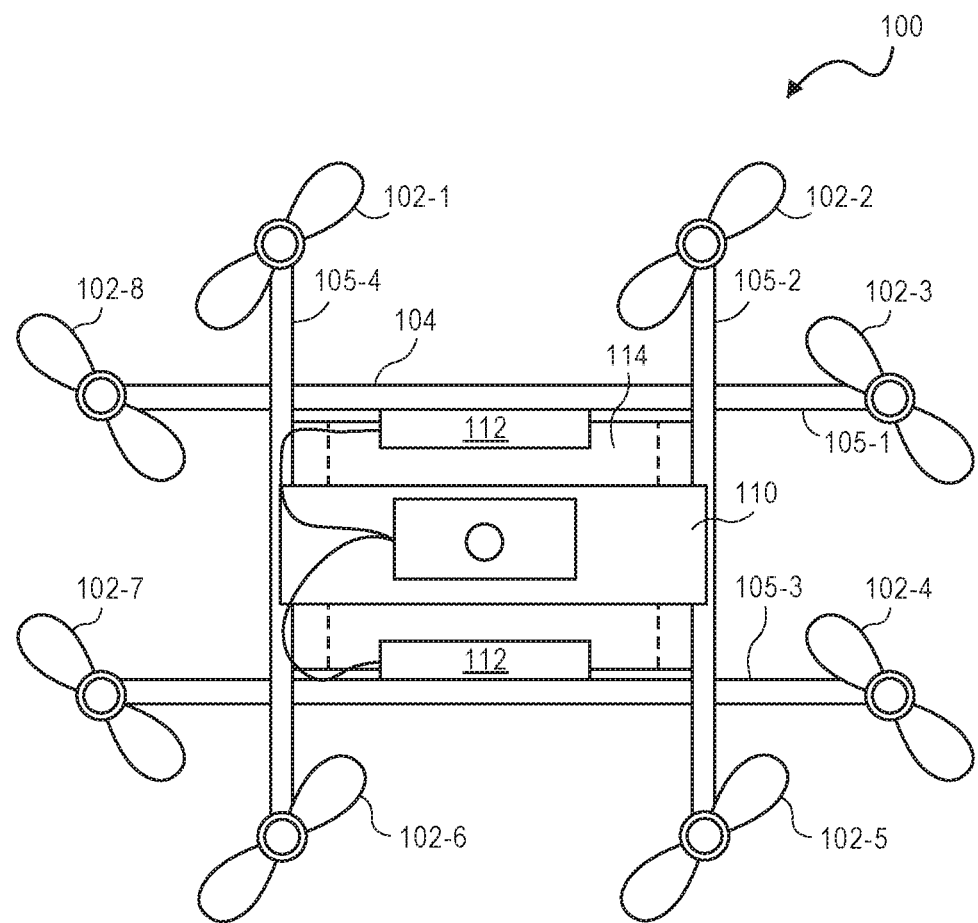
FIG. 1 is a schematic diagram of a top-down view of an aerial vehicle, in accordance with implementations of the present disclosure.

As is set forth in greater detail below, implementations of the present disclosure are directed to redundant battery management systems and methods, or generally power supply monitoring systems and methods, to monitor a state of charge, a state of health, and/or a state of power of a power supply. For example, the power supply, e.g., a battery including one or more stacked electrochemical cells, may be a component of an aerial vehicle, and may provide power to various components of the aerial vehicle. In addition, the battery may include an associated battery management system (BMS), e.g., an on-battery BMS, that is configured to monitor, estimate, calculate, predict, and/or determine states of charge, health, and/or power of the battery based on voltage, current, temperature, or other parameters associated with the battery.

Because the on-battery BMS may be the sole subsystem or component tasked with monitoring, estimating, calculating, predicting, and/or determining states of charge, health, and/or power of the battery, the on-battery BMS may comprise a single point of failure. For example, if the on-battery BMS erroneously determines one or more of the states of charge, health, and/or power of the battery, a control system of the aerial vehicle may continue to control operations of the aerial vehicle based on such erroneous determinations, which may result in unsafe, unreliable, or inefficient operations of the aerial vehicle.

Accordingly, the redundant battery management systems and methods described herein may comprise one or more off-battery, off-vehicle, redundant, and/or remote battery management systems to corroborate or support the on-battery BMS. For example, parameter data associated with the battery may be transmitted to one or more remote BMS, and the one or more remote BMS may process and send back determinations of states of charge, health, and/or power of the battery. In some example embodiments, the remote BMS may be associated with a remote location separate from the aerial vehicle, e.g., a remote computing system and/or server in communication with the aerial vehicle. In other example embodiments, the remote BMS may be associated with other subsystems or components on-board the aerial vehicle but separate from the battery and the on-battery BMS, e.g., a controller, subsystem, or component in communication with the battery, on-battery BMS, or aerial vehicle control system. In further example embodiments, the remote BMS may comprise various combinations of off-battery BMS, off-vehicle BMS, redundant BMS, and/or remote BMS computing systems or servers.

Further, the on-battery BMS and one or more remote BMS may comprise various types of battery state determination algorithms, models, and/or estimators. For example, a BMS may comprise electrical models or algorithms, physics-based models or algorithms, look-up tables, linear regression models, decision trees, neural network models or algorithms, other types of models or algorithms, Kalman filter-based estimators, extended Kalman filter-based estimators, particle filter-based estimators, other types of estimators, and/or various combinations thereof. Moreover, an example on-battery BMS and one or more remote BMS may comprise various combinations of different types of battery state determination algorithms, models, and/or estimators, including a same type, a different type, relatively simple implementations of a type, relatively complex implementations of a type, or other combinations thereof. Furthermore, the various types of battery state determination algorithms, models, and/or estimators may also estimate, calculate, predict, and/or determine other figures of merit associated with a battery, in addition to states of charge, health, and/or power.

In some example embodiments, states of charge, health, and/or power of an electrochemical cell may be determined from electrical parameters of the battery, e.g., current, voltage, or other parameters. In other example embodiments, states of charge, health, and/or power of an electrochemical cell may be determined from physics-based parameters of the battery, e.g., ion movement, transfer of charge, or other parameters. In further example embodiments, states of charge, health, and/or power of an electrochemical cell may be determined from various other parameters of the battery, e.g., temperature, dimensions, or other parameters.

Based on the determinations of states of charge, health, and/or power of the battery received from one or more remote BMS, and/or in combination with determinations of states of charge, health, and/or power of the battery by the on-battery BMS, a control system of the aerial vehicle may make determinations as to states of charge, health, and/or power of the battery. Then, the control system of the aerial vehicle may instruct or control operations of the aerial vehicle based on the determinations of states of charge, health, and/or power of the battery based on respective determinations from the one or more remote BMS and/or the on-battery BMS.

A battery, or power supply, may generally comprise one or a plurality of electrochemical cells, such as lithium ion cells or other types of cells. An example battery may be configured with a particular architecture, such as a plurality of cells connected in series, a plurality of cells connected in parallel, or a mixed architecture of cells connected in series and parallel. Generally, voltage, current, temperature, or other battery parameter data may be measured, estimated, predicted, or calculated for individual cells, and/or for individual groups of connected cells. Moreover, the figures of merit described herein may be determined, generated, or calculated at least partially based on the known, particular architecture of the battery.

Generally, a state of charge of an electrochemical cell of a battery may refer to a level of charge, e.g., between 0% (no charge) and 100% (full charge), for the electrochemical cell, which may represent an amount of charge or energy remaining in the battery, In addition, a state of health of an electrochemical cell of a battery may generally refer to a condition of the cell relative to its ideal specifications, e.g., between 0% (does not meet any of its ideal specifications) and 100% (fully meets all of its ideal specifications), which may relate to one or more parameters such as capacity, resistance, impedance, conductance, voltage, current, and others. Further, a state of power of an electrochemical cell of a battery may generally refer to an ability of the electrochemical cell to meet a specific power request at a specific point in time, which may also relate to one or more parameters such as capacity, resistance, impedance, conductance, voltage, current, and others. Moreover, each of the states of charge, health, and/or power may depend upon or be interrelated with others of the states of charge, health, and/or power.

FIG. 1 illustrates a schematic diagram of a top-down view of an aerial vehicle 100, in accordance with implementations of the present disclosure. As illustrated, the aerial vehicle 100 includes eight propellers 102-1, 102-2, 102-3, 102-4, 102-5, 102-6, 102-7. 102-8 spaced about the frame 104 of the aerial vehicle. The propellers 102 may be any form of propeller (e.g., graphite, carbon fiber) and of a size sufficient to lift the aerial vehicle 100 and any inventory engaged by the aerial vehicle 100 so that the aerial vehicle 100 can navigate through the air, for example, to deliver an item to a delivery location. While this example includes eight propellers, in other implementations, more or fewer propellers may be utilized, Likewise, in some implementations, the propellers may be positioned at different locations on the aerial vehicle 100. In addition, alternative methods of propulsion may be utilized. For example, fans, jets, turbojets, turbo fans, jet engines, electric jets, and the like may be used to propel the aerial vehicle.

The frame 104 or body of the aerial vehicle 100 may likewise be of any suitable material, such as graphite, carbon fiber, aluminum, metals, plastics, composites, or other materials. In this example, the frame 104 of the aerial vehicle 100 includes four rigid members 105-1, 105-2, 105-3, 105-4, or beams arranged in a hash pattern with the rigid members intersecting and joined at approximately perpendicular angles. In this example, rigid members 105-1 and 105-3 are arranged parallel to one another and are approximately the same length. Rigid members 105-2 and 105-4 are arranged parallel to one another, yet perpendicular to rigid members 105-1 and 105-3. Rigid members 105-2 and 105-4 are approximately the same length. In some embodiments, all of the rigid members 105 may be of approximately the same length, while in other implementations some or all of the rigid members may be of different lengths. Likewise, the spacing between the two sets of rigid members may be approximately the same or different.

While the implementation illustrated in FIG. 1 includes four rigid members 105 that are joined to form the frame 104, in other implementations, there may be fewer or more components to the frame 104. For example, rather than four rigid members, in other implementations, the frame 104 of the aerial vehicle 100 may be configured to include six rigid members. In such an example, two of the rigid members 105-2, 105-4 may be positioned parallel to one another. Rigid members 105-1, 105-3 and two additional rigid members on either side of rigid members 105-1, 105-3 may all be positioned parallel to one another and perpendicular to rigid members 105-2, 105-4. With additional rigid members, additional cavities with rigid members on all four sides may be formed by the frame 104. A cavity within the frame 104 may be configured to include one or more components, e.g., an inventory engagement mechanism for the engagement, transport, and delivery of item(s) and/or containers that contain item(s).

In some implementations, the aerial vehicle may be configured for aerodynamics. For example, an aerodynamic housing may be included on the aerial vehicle that encloses the aerial vehicle control system 110, one or more of the rigid members 105, the frame 104, and/or other components of the aerial vehicle 100. The housing may be made of any suitable material(s), such as graphite, carbon fiber, aluminum, metals, plastics, composites, or other materials. Likewise, in some implementations, the location and/or the shape of the inventory (e.g., item or container) may be aerodynamically designed. For example, in some implementations, the inventory engagement mechanism may be configured such that, when the inventory is engaged, it is enclosed within the frame and/or housing of the aerial vehicle 100 so that no additional drag is created during transport of the inventory by the aerial vehicle 100. In other implementations, the inventory may be shaped to reduce drag and provide a more aerodynamic design of the aerial vehicle and the inventory. For example, if the inventory is a container and a portion of the container extends below the aerial vehicle when engaged, the exposed portion of the container may have a curved shape.

The propellers 102 and corresponding propeller motors are positioned at both ends of each rigid member 105. The rigid members 105 to which a propeller motor is mounted is also referred to herein as a motor arm. The propeller motors may be any form of motor capable of generating enough speed with the propellers to lift the aerial vehicle 100 and any engaged inventory, thereby enabling aerial transport of the inventory. For example, the propeller motors may each be a FX-4006-13 740 kv multi rotor motor. The propellers may be of any size and material sufficient to lift the aerial vehicle 100 and any engaged payload. In some implementations, the propellers may be formed of a conductive material, such as carbon fiber, aluminum, graphite, silver, copper, steel, etc.

Mounted to the frame 104 is the aerial vehicle control system 110. In this example, the aerial vehicle control system 110 is mounted in the middle and on top of the frame 104. The aerial vehicle control system 110, as discussed in further detail below at least with respect to FIG. 7, controls the operation, routing, navigation, communication, and power supply monitoring, as well as the inventory engagement mechanism, of the aerial vehicle 100.

Likewise, the aerial vehicle 100 includes one or more power supplies or modules 112. In this example, the aerial vehicle 100 includes two power supplies 112 that are removably mounted to the frame 104. The power supply for the aerial vehicle may be in the form of battery power, solar power, gas power, super capacitor, fuel cell, alternative power generation source, or a combination thereof. For example, the power supplies 112 may each be a 6000 mAh lithium-ion polymer battery, polymer lithium ion (Li-poly, Li-Pol, LiPo, LIP, PLI or Lip) battery. The power supplies 112 are coupled to and provide power for the aerial vehicle control system 110 the propeller motors, and other components.

In some implementations, one or more of the power modules may be configured such that it can be autonomously removed and/or replaced with another power module while the aerial vehicle is landed. For example, when the aerial vehicle lands at a delivery location, relay location, and/or materials handling facility, the aerial vehicle may engage with a charging member at the location that will recharge and/or replace the power module.

As mentioned above, the aerial vehicle 100 may also include an inventory engagement mechanism 114. The inventory engagement mechanism may be configured to engage and disengage items and/or containers that hold items. In this example, the inventory engagement mechanism 114 is positioned within a cavity of the frame 104 that is formed by the intersections of the rigid members 105. The inventory engagement mechanism may be positioned beneath the aerial vehicle control system 110. In implementations with additional rigid members, the aerial vehicle may include additional inventory engagement mechanisms and/or the inventory engagement mechanism 114 may be positioned in a different cavity within the frame 104. The inventory engagement mechanism may be of any size sufficient to securely engage and disengage containers that contain inventory. In other implementations, the engagement mechanism may operate as the container, containing the inventory item(s) to be delivered. The inventory engagement mechanism may communicate with (via wired or wireless communication) and be controlled by the aerial vehicle control system 110.

While the implementations of the aerial vehicle discussed herein utilize propellers to achieve and maintain flight, in other implementations, the aerial vehicle may be configured in other manners. For example, the aerial vehicle may include fixed wings, propellers and fixed wings, other propulsion mechanisms, and/or combinations thereof. In addition, the aerial vehicle may utilize one or more propulsion mechanisms to enable takeoff and landing, and a fixed wing configuration or a combination wing and propulsion mechanism configuration to sustain flight while the aerial vehicle is airborne. Furthermore, the aerial vehicle may comprise other structures, configurations, or arrangements, and/or the aerial vehicle may also include various other types of components or subsystems.

Further, while an aerial vehicle 100 is described herein as an example vehicle that may utilize the redundant battery management systems and methods described herein to monitor the power supplies 112 that act as a power source for its propulsion mechanisms, control system 110, and other components, the redundant battery management systems and methods described herein may be utilized to monitor power supplies of any other form of vehicle, e.g., aerial vehicle, land-based vehicle, water-based vehicle, or others. In addition, the redundant battery management systems and methods described herein may be used in any other system, machine, apparatus, instrument, device, or object having one or more power supplies that may be monitored, e.g., robotic apparatus, automated machines, electronic devices, cellphones or smartphones, connected devices such as doorbells, security systems, appliances, or the like, or various other types of systems, machines, apparatus, instruments, devices, or objects.

Figure 2:
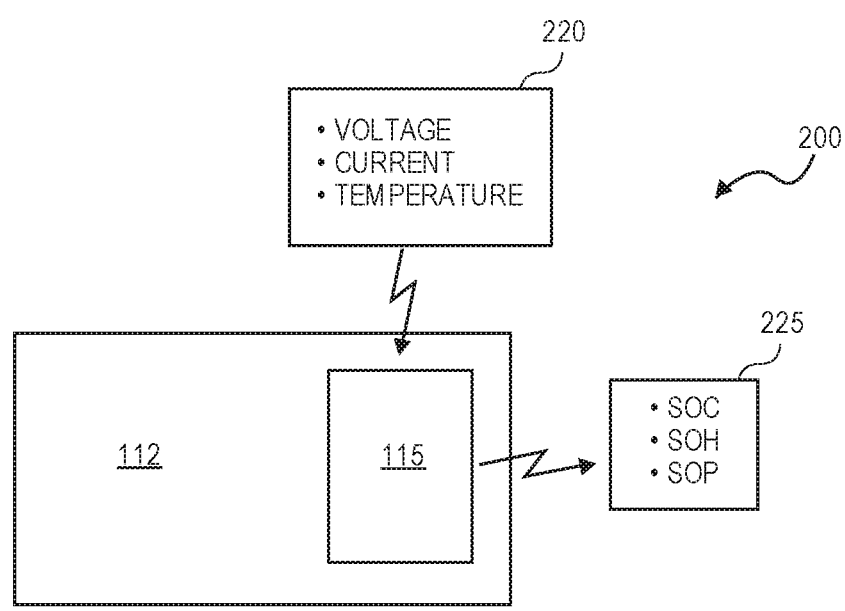
FIG. 2 is a schematic diagram of an on-battery battery management system, in accordance with implementations of the present disclosure.

FIG. 2 is a schematic diagram of an on-battery battery management system 200, in accordance with implementations of the present disclosure.

Generally, as described herein, a state of charge of an electrochemical cell of a battery may refer to a level of charge, e.g., between 0% (no charge) and 100% (full charge), for the electrochemical cell, which may represent an amount of charge or energy remaining in the battery. In addition, a state of health of an electrochemical cell of a battery may generally refer to a condition of the cell relative to its ideal specifications, e.g., between 0% (does not meet any of its ideal specifications) and 100% (fully meets all of its ideal specifications), which may relate to one or more parameters such as capacity, resistance, impedance, conductance, voltage, current, and others. Further, a state of power of an electrochemical cell of a battery may generally refer to an ability of the electrochemical cell to meet a specific power request at a specific point in time, which may also relate to one or more parameters such as capacity, resistance, impedance, conductance, voltage, current, and others. Moreover, each of the states of charge, health, and/or power may depend upon or be interrelated with others of the states of charge, health, and/or power.

In addition, as described herein, states of charge, health, and/or power of an electrochemical cell may be determined from electrical parameters of the battery, e.g., current, voltage, resistance, impedance, or other parameters. In other example embodiments, states of charge, health, and/or power of an electrochemical cell may be determined from physics-based parameters of the battery, e.g., ion movement, transfer of charge, or other parameters. In further example embodiments, states of charge, health, and/or power of an electrochemical cell may be determined from various other parameters of the battery, e.g., temperature, temperature changes, dimensions, dimensional changes, or other parameters.

For example, as shown in FIG. 2, a power supply or battery 112 may include an on-battery BMS 115. The on-battery BMS 115 may be configured to determine one or more of a state of charge (SOC), state of health (SOH), and/or state of power (SOP) 225 associated with the battery 112 based upon one or more parameters 220 of the battery 112. The various parameters 220 may be measured, estimated, predicted, and/or calculated based on data received from various sensors, such as voltmeters, ammeters, multimeters, temperature sensors, optical sensors, stress or strain sensors, or other types of sensors.

Further, the on-battery BMS 115 may comprise one or more of various types of battery state determination algorithms, models, and/or estimators. For example, the on-battery BMS 115 may comprise electrical models or algorithms, physics-based models or algorithms, look-up tables, linear regression models, decision trees, neural network models or algorithms, other types of models or algorithms, Kalman filter-based estimators, extended Kalman filter-based estimators, particle filter-based estimators, other types of estimators, and/or various combinations thereof. In addition, the various types of battery state determination algorithms, models, and/or estimators may also estimate, calculate, predict, and/or determine other figures of merit associated with a battery, in addition to states of charge, health, and/or power 225.

For example, other figures of merit may also include health alerts, health alarms, lifetime data, and/or historical data. Health alerts or health alarms may comprise notices, alerts, or error codes determined by the BMS 115 based on battery parameter data. Example health alerts or health alarms may include notices or alerts related to battery voltage being too high, battery voltage being too low, battery current being too high, battery current being too low, battery cell temperature being too high, battery cell temperature being too low, etc. In addition, example lifetime data or historical data may comprise data associated with various parameters or figures of merit, extremal values of various parameters or figures of merit, statistical data associated with various parameters or figures of merit, and/or other types of data associated with various battery parameters or various determined figures of merit.

The on-battery BMS 115 may generally comprise relatively simple or less computationally intensive algorithms, models, and/or estimators, at least partially due to limited processing power associated with the on-battery BMS 115. Generally, physics-based or neural network models or algorithms may be relatively more computationally intensive, while electrical models or algorithms, look-up tables, linear regression models, or decision trees may be relatively less computationally intensive. Further, various types or classes of estimators may also be relatively more or relatively less computationally intensive. Thus, the on-battery BMS 115 may generally comprise relatively simple or less computationally intensive versions, types, classes, or implementations of the various algorithms, models, and/or estimators.

Based on the determination of states of charge, health, and/or power 225 of the battery by the on-battery BMS 115, a control system of the aerial vehicle may instruct or control operations of the aerial vehicle. However, various types of faults or errors may result in erroneous determinations of states of charge, health, and/or power 225 by the on-battery BMS 115, which may correspondingly result in unsafe, unreliable, or inefficient operations of the aerial vehicle.

For example, a hardware fault or error may cause the on-battery BMS 115 to stop functioning or to operate erroneously, such that the on-battery BMS 115 may not provide any determinations of states of charge, health, and/or power, and/or may provide erroneous determinations. in addition, the model or algorithm used or implemented by the on-battery BMS 115 may be inherently flawed, such that correct operation of the model or algorithm by the on-battery BMS 115 may nevertheless provide erroneous determinations. Further, the model or algorithm used or implemented by the on-battery BMS 115 may include software or coding faults or errors, such that the on-battery BMS 115 may provide erroneous determinations.

Moreover, a version or implementation of the model, algorithm, or firmware used by the on-battery BMS 115 may by incorrect or mismatched with the particular type or chemistry of the battery 112, such that the on-battery BMS 115 may provide erroneous determinations. Still further, a functional fault or error in the model, algorithm, or firmware used by the on-battery. BMS 115 may prevent accurate reporting or communication of determinations to other systems such as an aerial vehicle control system. In yet another example, the measured, estimated, or predicted parameters or inputs provided to the model or algorithm used by the on-battery BMS 115 may be outside of tested ranges of such parameters for the model or algorithm, such that the on-battery BMS 115 may provide erroneous determinations. Various other types of faults or errors associated with hardware, software, firmware, communication, or other aspects or portions of the on-battery BMS 115 may also result in erroneous determinations of states of charge, health, and/or power.

Furthermore, erroneous determinations of states of charge, health, and/or power may have various resulting consequences. For example, an erroneous determination of a state of charge may result in an aerial vehicle control system instructing continuing of operations of the aerial vehicle when the actual charge or energy remaining in the battery is less than the erroneous determination, and/or may result in an aerial vehicle control system instructing discontinuing of operations of the aerial vehicle when the actual charge or energy remaining in the battery is more than the erroneous determination. One example operation of the aerial vehicle may include instructing operation of motors and propellers to maintain flight and continue a mission of the aerial vehicle.

In addition, an erroneous determination of a state of health may result in an aerial vehicle control system instructing continuing of various operations of the aerial vehicle when the actual energy capacity of the battery is less than the erroneous determination, and/or may result in an aerial vehicle control system instructing discontinuing of various operations of the aerial vehicle when the actual energy capacity of the battery is more than the erroneous determination. One example operation of the aerial vehicle may include instructing performance of a particular sequence of tasks or flights by the aerial vehicle prior to recharging or replacing the battery.

Further, an erroneous determination of a state of power may result in an aerial vehicle control system instructing delivery of requested power for operations of the aerial vehicle when the actual available power of the battery is less than the erroneous determination, and/or may result in an aerial vehicle control system instructing non-delivery of requested power for operations of the aerial vehicle when the actual available power of the battery is more than the erroneous determination. One example operation of the aerial vehicle may include instructing performance of a particular flight maneuver or operation having an associated power requirement by the aerial vehicle.

In other example embodiments associated with aerial vehicles or other types of vehicles, states of charge, health, and/or power of an electrochemical cell may be determined based on various stages of flight or operations without direct knowledge, measurement, estimation, or prediction of data associated with one or more of the electrical, physics-based, or other parameters of the battery. For example, the various stages of flight for an aerial vehicle may comprise takeoff, forward flight, hover, and landing, and each of the different stages of flight may have associated, known rates of energy consumption and/or power requirements, e.g., based on models or algorithms of aerial vehicle operations, including neural network models or algorithms. Then, based on the associated, known rates of energy consumption and/or power requirements, states of charge, health, and/or power may be estimated or predicted for the aerial vehicle. Further, the estimation or prediction of states of charge, health, and/or power of the aerial vehicle may be further based upon a known state of charge of a battery of the aerial vehicle, and/or may be further based upon a known state of health of the battery.

Although generally described herein with reference to an aerial vehicle, estimation or prediction of states of charge, health, and/or power of a battery may be applied to power sources of various other types of systems, machines, apparatus, instruments, devices, or objects based on known, modeled, or predicted usage or operational profiles of such systems.

Figure 3:
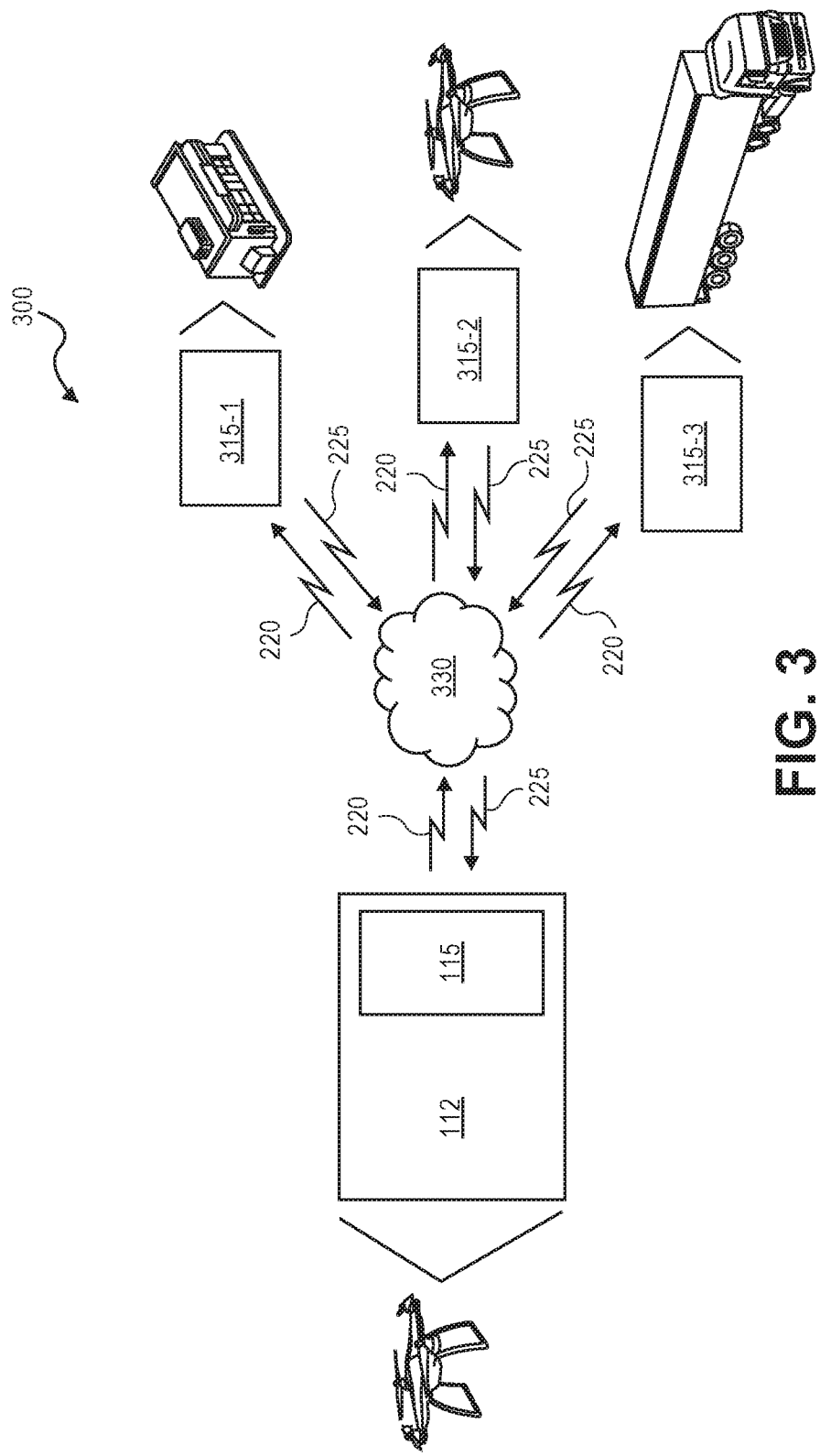
FIG. 3 is a schematic diagram of example off-vehicle, remote battery management systems, in accordance with implementations of the present disclosure.

FIG. 3 is a schematic diagram of example off-vehicle, remote battery management systems 300, in accordance with implementations of the present disclosure.

As shown in FIG. 3, a power supply or battery 112 may include an on-battery BMS 115. As described at least with respect to FIG. 2, the on-battery BMS 115 may be configured to determine one or more of a state of charge (SOC), state of health (SOH), and/or state of power (SOP) 225 associated with the battery 112 based upon data associated with one or more parameters 220 of the battery 112. The various parameters 220 may be measured, estimated, predicted, or calculated based on data from various sensors, such as voltmeters, ammeters, multimeters, temperature sensors, optical sensors, stress or strain sensors, or other types of sensors.

In addition, the example off-vehicle, remote battery management systems 300 may also include one or more remote BMS 315-1, 315-2, 315-3. The remote BMS 315 may be configured to receive data associated with one or more parameters 220 of the battery 112. Based upon the data associated with one or more parameters 220 of the battery 112, the one or more remote BMS 315 may also be configured to determine one or more of a state of charge (SOC), state of health (SOH), and/or state of power (SOP) 225 associated with the battery 112.

Each of the remote BMS 315 may be in communication with the battery 112, on-battery BMS 115, and/or an aerial vehicle control system of an aerial vehicle having the battery 112 and the on-battery BMS 115 via a network 330. For example, the network 330 may comprise any type of network or communication medium, e.g., such as the Internet, a local area network (LAN), a wide area network (WAN), cellular network, or any other type of network. The communications via the network 330 may be wired or wireless, such as via cellular signals, satellite signals, WiFi signals, or other types of communication signals.

Each of the remote BMS 315 may receive data associated with one or more parameters 220 of the battery 112 via the network 330, may process the data associated with one or more parameters 220 using one or more models, algorithms, and/or estimators to determine one or more of states of charge, health, and/or power 225, and may send or transmit the determined states of charge, health, and/or power 225 to the battery 112, the on-battery BMS 115, and/or the aerial vehicle control system of the aerial vehicle having the battery 112 and the on-battery BMS 115 via the network 330.

Further, each of the remote BMS 315 and/or the on-battery BMS 115 may comprise one or more of various types of battery state determination algorithms, models, and/or estimators. For example, the remote BMS 315 and/or the on-battery BMS 115 may comprise electrical models or algorithms, physics-based models or algorithms, look-up tables, linear regression models, decision trees, neural network models or algorithms, other types of models or algorithms, Kalman filter-based estimators, extended Kalman filter-based estimators, particle filter-based estimators, other types of estimators, and/or various combinations thereof. Moreover, the remote BMS 315 and/or the on-battery BMS 115 may comprise various combinations of different types of battery state determination algorithms, models, and/or estimators, including a same type, a different type, relatively simple implementations of a type, relatively complex implementations of a type, or other combinations thereof. Furthermore, the various types of battery state determination algorithms, models, and/or estimators may also calculate, estimate, predict, and/or determine other figures of merit associated with a battery, in addition to states of charge, health, and/or power 225.

In some example embodiments, the data associated with one or more parameters 220 of the battery 112 that is received by the remote BMS 315 may be degraded, may be of a different or unexpected type or format, may be incomplete, or may otherwise be less than optimal for determination of a battery state. The degraded, incomplete, or suboptimal state of the data associated with battery parameters may vary based on one or more faults or errors experienced by the on-battery BMS, such as faults or errors associated with hardware, software, firmware, communication, or other aspects or portions of the on-battery BMS as described herein. In such examples, the remote BMS 315 may comprise one or more battery state determination algorithms, models, and/or estimators that may be configured to process the degraded, incomplete, or suboptimal data associated with battery parameters and still provide a battery state determination, e.g., which may be a best estimate, guess, or prediction of the battery state based on the degraded, incomplete, or suboptimal data associated with battery parameters.

Other example figures of merit may also include health alerts, health alarms, lifetime data, and/or historical data. Health alerts or health alarms may comprise notices, alerts, or error codes determined by the BMS 315 based on battery parameter data. Example health alerts or health alarms may include notices or alerts related to battery voltage being too high, battery voltage being too low, battery current being too high, battery current being too low, battery cell temperature being too high, battery cell temperature being too low, etc. In addition, example lifetime data or historical data may comprise data associated with various parameters or figures of merit, extremal values of various parameters or figures of merit, statistical data associated with various parameters or figures of merit, and/or other types of data associated with various battery parameters or various determined figures of merit.

The remote BMS 315 may generally comprise relatively complex or more computationally intensive algorithms, models, and/or estimators, at least partially based on available processing power associated with the remote BMS 315. Generally, physics-based or neural network models or algorithms may be relatively more computationally intensive, while electrical models or algorithms, look-up tables, linear regression models, or decision trees may be relatively less computationally intensive. Further, various types or classes of estimators may also be relatively more or relatively less computationally intensive. Thus, the remote BMS 315 may generally comprise relatively complex or more computationally intensive versions, types, classes, or implementations of the various algorithms, models, and/or estimators. In other example embodiments, however, the remote BMS 315 may generally comprise relatively simple or less computationally intensive versions, types, classes, or implementations of the various algorithms, models, and/or estimators.

Further, the various combinations of remote BMS 315 may comprise algorithms, models, and/or estimators of a same type, e.g., various implementations of neural network models, may comprise algorithms, models, and/or estimators of different types, e.g., an electrical model, a neural network model, and various types of estimators, and/or may comprise various different combinations of the same and different types of algorithms, models, and/or estimators. In addition, different combinations of algorithms, models, and/or estimators having the same or different types, and/or having different levels of complexity or computational intensity, may result in varying levels of confidence, precision, and/or accuracy associated with respective determinations of states of charge, health, and/or power.

In some example embodiments, one or more remote BMS 315 may comprise remote computing systems or servers associated with respective locations that are distinct or separate from the battery 112, the on-battery BMS 115, and/or the aerial vehicle control system of the aerial vehicle having the battery 112 and the on-battery BMS 115. The remote computing systems or servers may be associated with data centers, server farms, distribution centers, material handling facilities, warehouses, retail locations, or any other types of locations.

In other example embodiments, one or more remote BMS 315 may comprise remote computing systems associated with various types of systems, machines, apparatus, devices, or vehicles. For example, a remote BMS 315 may be associated with a robotic apparatus or automated machine within a manufacturing or distribution facility. In another example, a remote BMS 315 may be associated with a vehicle, such as another aerial vehicle, a ground-based vehicle, or other mobile computing system. In a further example, a remote BMS 315 may be associated with an electronic device or mobile computing device, such as a laptop computer, tablet computer, a cellphone or smartphone, a connected device, or other device or object.

Based on the determinations of states of charge, health, and/or power 225 of the battery by the remote BMS 315 and/or the on-battery BMS 115, a control system of an aerial vehicle may process the received determinations from respective BMS 115, 315, and generate or determine a battery state based on all received determinations. Then, the control system of the aerial vehicle may instruct or control operations of the aerial vehicle based on the determined battery state based on all received determinations.

Various processes and methods may be used to determine a battery state based on a plurality of received determinations from respective BMS 115, 315. For example, a most conservative and safety-oriented approach may utilize the determination associated with a lowest state of charge, lowest state of health, and/or lowest state of power as the determined battery state. In another example, various calculations based on the received determinations may be performed, such as calculating a mean, median, or mode to process and determine the battery state. In a further example, one or more outliers among the received determinations may be identified and removed from consideration to process and determine the battery state.

In yet another example, various weightings may be applied to received determinations from respective BMS 115, 315, which weightings may be based upon type, class, complexity, historical accuracy, or other aspects associated with individual BMS 115, 315 and their respective algorithms, models, and/or estimators. Some example weightings applied to received determinations from respective BMS 115, 315 may seek to reduce or minimize overweighting of determinations associated with a same type of algorithms, models, and/or estimators. Additional example weightings applied to received determinations from respective BMS 115, 315 may seek to balance or diversify weightings of determinations associated with different types of algorithms, models, and/or estimators. Other example weightings applied to received determinations from respective BMS 115, 315 may seek to decrease the weighting of determinations associated with simple or less computationally intensive algorithms, models, and/or estimators. Further example weightings applied to received determinations from respective BMS 115, 315 may seek to increase the weighting of determinations associated with complex or more computationally intensive algorithms, models, and/or estimators. Other types, examples, or combinations of weightings may also be applied to received determinations from respective BMS 115, 315 to determine a battery state.

Figure 4:
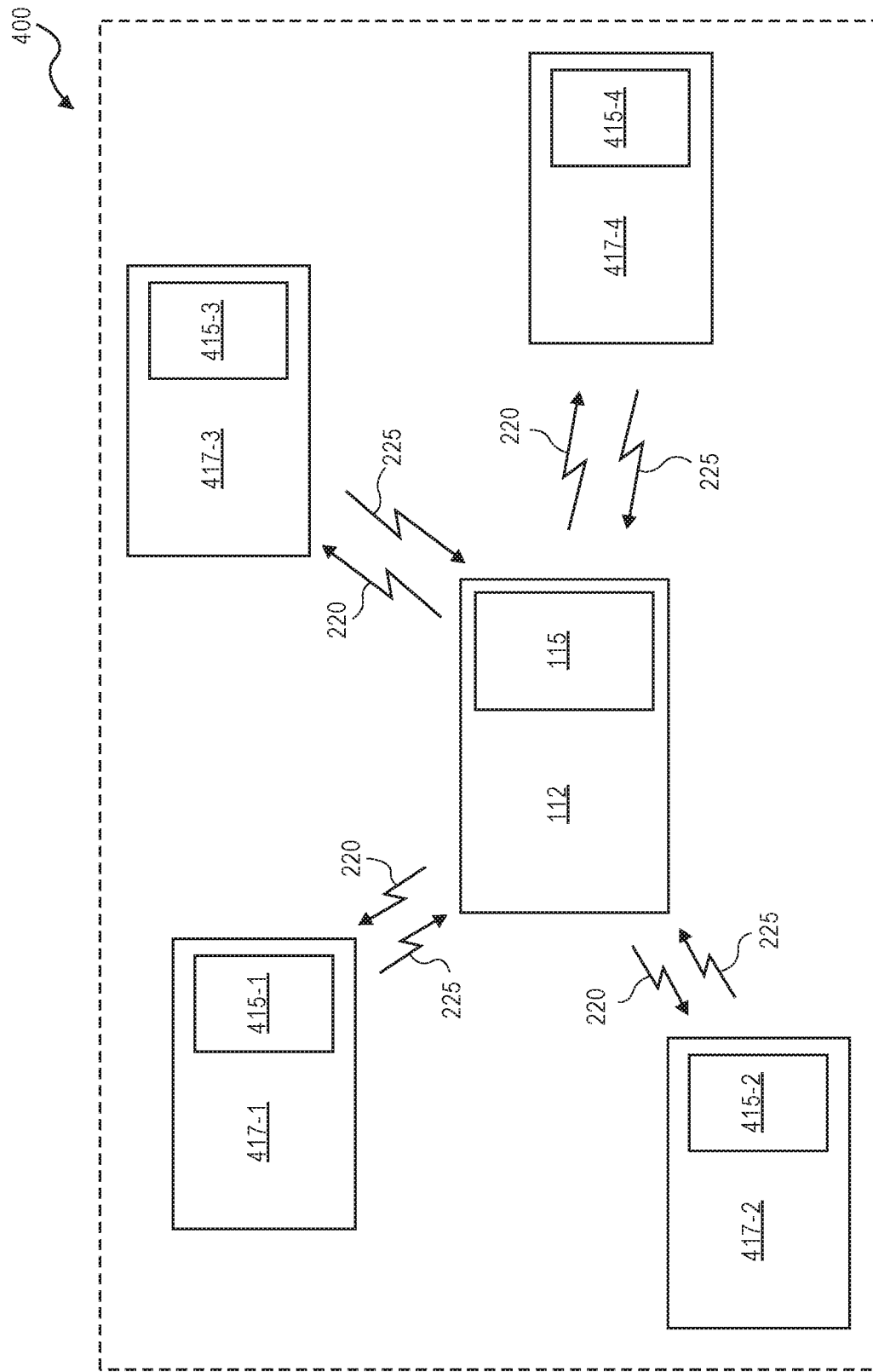
FIG. 4 is a schematic diagram of example on-vehicle, redundant battery management systems, in accordance with implementations of the present disclosure.

FIG. 4 is a schematic diagram of example on-vehicle, redundant battery management systems 400, in accordance with implementations of the present disclosure.

As shown in FIG. 4, a power supply or battery 112 may include an on-battery BMS 115. As described at least with respect to FIG. 2, the on-battery BMS 115 may be configured to determine one or more of a state of charge (SOC), state of health (SOH), and/or state of power (SOP) 225 associated with the battery 112 based upon data associated with one or more parameters 220 of the battery 112. The various parameters 220 may be measured, estimated, predicted, or calculated based on data from various sensors, such as voltmeters, ammeters, multimeters, temperature sensors, optical sensors, stress or strain sensors, or other types of sensors.

In addition, the example on-vehicle, redundant battery management systems 400 may also include one or more off-battery or remote BMS 415-1, 415-2, 415-3, 415-4. The off-battery BMS 415 may be configured to receive data associated with one or more parameters 220 of the battery 112. Based upon the data associated with one or more parameters 220 of the battery 112, the one or more off-battery BMS 415 may also be configured to determine one or more of a state of charge (SOC), state of health (SOH), and/or state of power (SOP) 225 associated with the battery 112.

Each of the off-battery BMS 415 may be in communication with the battery 112, on-battery BMS 115, and/or an aerial vehicle control system of an aerial vehicle having the battery 112 and the on-battery BMS 115 via a communication medium, interface, bus, or network of the aerial vehicle. For example, the aerial vehicle may comprise any type of communication medium, interface, bus, or network, e.g., such as a local area network (LAN), controller area network (CAN), serial peripheral interface (SPI), input/output (I/O) interface, or any other type of communication medium, interface, bus, or network. The communications between the on-battery BMS 115 and the off-battery BMS 415 may be wired or wireless, such as via cellular signals, WiFi signals, optical signals, or other types of communication signals.

Each of the off-battery BMS 415 may receive data associated with one or more parameters 220 of the battery 112 via the communication medium, interface, bus, or network, may process the data associated with one or more parameters 220 using one or more models, algorithms, and/or estimators to determine one or more of states of charge, health, and/or power 225, and may send or transmit the determined states of charge, health, and/or power 225 to the battery 112, the on-battery BMS 115, and/or the aerial vehicle control system of the aerial vehicle having the battery 112 and the on-battery BMS 115 via the communication medium, interface, bus, or network.

Further, each of the off-battery BMS 415 and/or the on-battery BMS 115 may comprise one or more of various types of battery state determination algorithms, models, and/or estimators. For example, the off-battery BMS 415 and/or the on-battery BMS 115 may comprise electrical models or algorithms, physics-based models or algorithms, look-up tables, linear regression models, decision trees, neural network models or algorithms, other types of models or algorithms, Kalman filter-based estimators, extended Kalman filter-based estimators, particle filter-based estimators, other types of estimators, and/or various combinations thereof. Moreover, the off-battery BMS 415 and/or the on-battery BMS 115 may comprise various combinations of different types of battery state determination algorithms, models, and/or estimators, including a same type, a different type, relatively simple implementations of a type, relatively complex implementations of a type, or other combinations thereof. Furthermore, the various types of battery state determination algorithms, models, and/or estimators may also calculate, estimate, predict, and/or determine other figures of merit associated with a battery, in addition to states of charge, health, and/or power 225.

In some example embodiments, the data associated with one or more parameters 220 of the battery 112 that is received by the off-battery BMS 415 may be degraded, may be of a different or unexpected type or format, may be incomplete, or may otherwise be less than optimal for determination of a battery state. The degraded, incomplete, or suboptimal state of the data associated with battery parameters may vary based on one or more faults or errors experienced by the on-battery BMS, such as faults or errors associated with hardware, software, firmware, communication, or other aspects or portions of the on-battery BMS as described herein. In such examples, the off-battery BMS 415 may comprise one or more battery state determination algorithms, models, and/or estimators that may be configured to process the degraded, incomplete, or suboptimal data associated with battery parameters and still provide a battery state determination, e.g., which may be a best estimate, guess, or prediction of the battery state based on the degraded, incomplete, or suboptimal data associated with battery parameters.

Other example figures of merit may also include health alerts, health alarms, lifetime data, and/or historical data. Health alerts or health alarms may comprise notices, alerts, or error codes determined by the BMS 415 based on battery parameter data. Example health alerts or health alarms may include notices or alerts related to battery voltage being too high, battery voltage being too low, battery current being too high, battery current being too low, battery cell temperature being too high, battery cell temperature being too low, etc. In addition, example lifetime data or historical data may comprise data associated with various parameters or figures of merit, extremal values of various parameters or figures of merit, statistical data associated with various parameters or figures of merit, and/or other types of data associated with various battery parameters or various determined figures of merit.

The off-battery BMS 415 may generally comprise relatively simple or less computationally intensive algorithms, models, and/or estimators, and/or relatively complex or more computationally intensive algorithms, models, and/or estimators, at least partially based on available processing power associated with the off-battery BMS 415. Generally, physics-based or neural network models or algorithms may be relatively more computationally intensive, while electrical models or algorithms, look-up tables, linear regression models, or decision trees may be relatively less computationally intensive. Further, various types or classes of estimators may also be relatively more or relatively less computationally intensive. Thus, the off-battery BMS 415 may generally comprise relatively simple or less computationally intensive versions, types, classes, or implementations, and/or relatively complex or more computationally intensive versions, types, classes, or implementations of the various algorithms, models, and/or estimators.

Further, the various combinations of off-battery BMS 415 may comprise algorithms, models, and/or estimators of a same type, e.g., various implementations of neural network models, may comprise algorithms, models, and/or estimators of different types, e.g., an electrical model, a neural network model, and various types of estimators, and/or may comprise various different combinations of the same and different types of algorithms, models, and/or estimators. In addition, different combinations of algorithms, models, and/or estimators having the same or different types, and/or having different levels of complexity or computational intensity, may result in varying levels of confidence, precision, and/or accuracy associated with respective determinations of states of charge, health, and/or power.

In some example embodiments, one or more off-battery BMS 415-1, 415-2, 415-3, 415-4 may comprise computing systems or devices associated with respective subsystems or components 417-1, 417-2, 417-3, 417-4 that are on-board the aerial vehicle and that are distinct or separate from the battery 112, the on-battery BMS 115, and/or the aerial vehicle control system of the aerial vehicle. The respective subsystems or components 417 having associated computing systems or devices may comprise on-board flight controllers, motor controllers, sensor controllers, or various other processors, subsystems, or components, or portions thereof.

Based on the determinations of states of charge, health, and/or power 225 of the battery by the off-battery BMS 415 and/or the on-battery BMS 115, a control system of an aerial vehicle may process the received determinations from respective BMS 115, 415, and generate or determine a battery state based on all received determinations, Then, the control system of the aerial vehicle may instruct or control operations of the aerial vehicle based on the determined battery state based on all received determinations.

Various processes and methods may be used to determine a battery state based on a plurality of received determinations from respective BMS 115, 415. For example, a most conservative and safety-oriented approach may utilize the determination associated with a lowest state of charge, lowest state of health, and/or lowest state of power as the determined battery state. In another example, various calculations based on the received determinations may be performed, such as calculating a mean, median, or mode to process and determine the battery state. In a further example, one or more outliers among the received determinations may be identified and removed from consideration to process and determine the battery state.

In yet another example, various weightings may be applied to received determinations from respective BMS 115, 415, which weightings may be based upon type, class, complexity, historical accuracy, or other aspects associated with individual BMS 115, 415 and their respective algorithms, models, and/or estimators. Some example weightings applied to received determinations from respective BMS 115, 415 may seek to reduce or minimize overweighting of determinations associated with a same type of algorithms, models, and/or estimators. Additional example weightings applied to received determinations from respective BMS 115, 415 may seek to balance or diversify weightings of determinations associated with different types of algorithms, models, and/or estimators. Other example weightings applied to received determinations from respective BMS 115, 415 may seek to decrease the weighting of determinations associated with simple or less computationally intensive algorithms, models, and/or estimators. Further example weightings applied to received determinations from respective BMS 115, 415 may seek to increase the weighting of determinations associated with complex or more computationally intensive algorithms, models, and/or estimators. Other types, examples, or combinations of weightings may also be applied to received determinations from respective BMS 115, 415 to determine a battery state.

Although the description herein may generally refer to continuous or substantially, continuous monitoring and corroboration of figures of merit associated with a power supply using redundant battery management systems, in sonic example embodiments, the redundant battery management systems and methods may be initiated or triggered based upon one or more factors, e.g., in order to conserve power, reduce processing load and/or communication bandwidth, and/or to ensure safety and reliability at critical times or points. For example, the various factors to initiate or trigger use of redundant battery management systems and methods may include determinations by the on-battery BMS related to threshold values or ranges of figures of merit of the battery. In another example, the various factors may include historical data related to figures of merit and current or expected operations or requirements of a vehicle or system. In a further example, the various factors may include determinations related to availability of connectivity or network communications with one or more remote BMS. In still another example, the various factors may include aspects of operations, flights, or missions of a system or aerial vehicle, such as before takeoff, during high altitude flight, during item delivery, during or after landing, etc. In yet another example, the various factors may include aspects of an environment of a vehicle or system, such as obstacles, obstructions, proximity of animals or people, potential damage or harm to other objects in proximity, etc. Various other factors may also be utilized to initiate or trigger use of redundant battery management systems and methods described herein ensure safe, reliable, and efficient operations.

Figure 5:
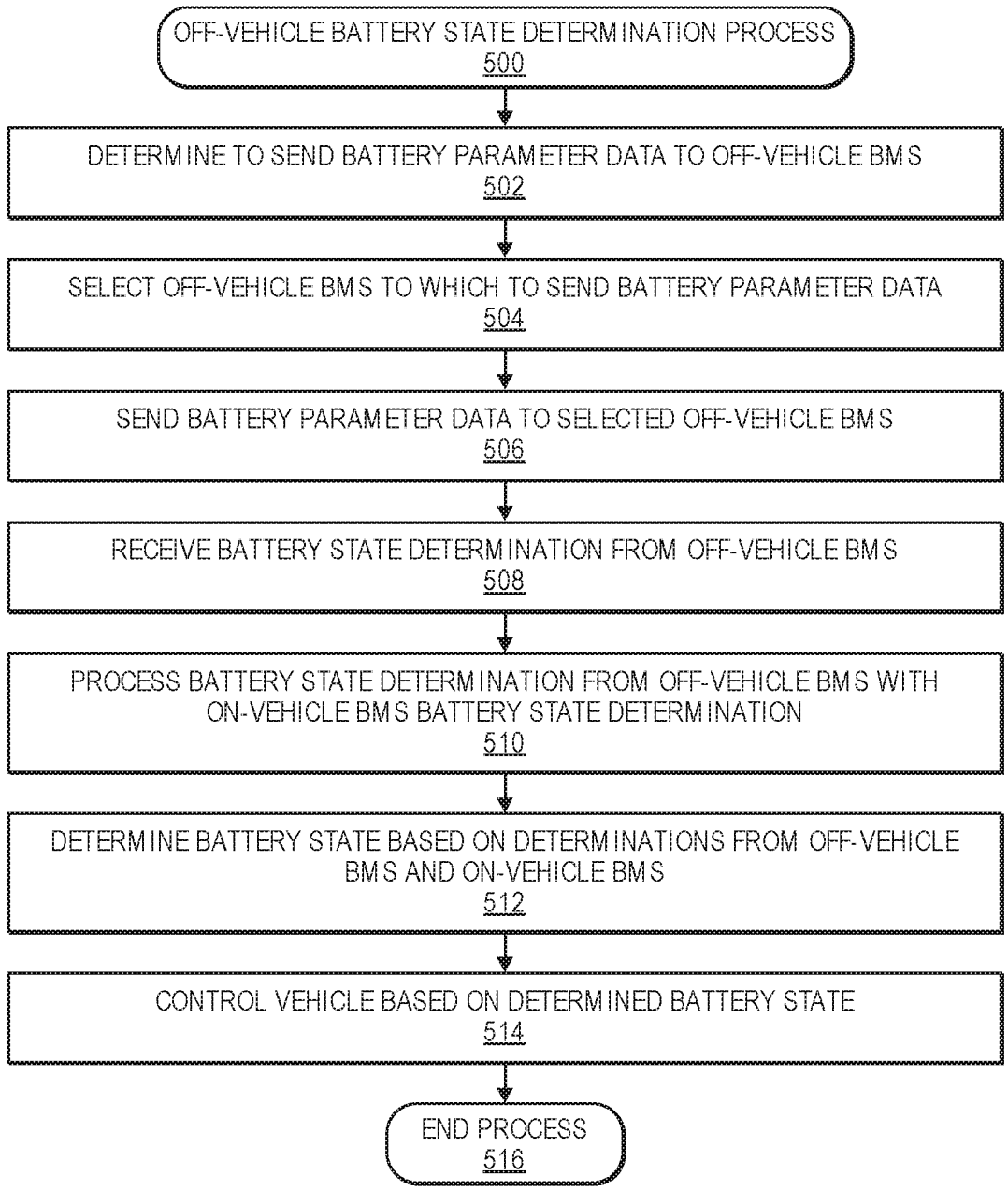
FIG. 5 is a flow diagram illustrating an example off-vehicle battery state determination process, in accordance with implementations of the present disclosure.

FIG. 5 is a flow diagram illustrating an example off-vehicle battery state determination process 500, in accordance with implementations of the present disclosure.

The process 500 may begin by determining to send battery parameter data to an off-vehicle BMS, as at 502. For example, various data associated with battery parameters, such as data associated with voltage, current, resistance, temperature, dimensions, or other parameters, may be sent or transmitted to one or more off-vehicle BMS via a network. The off-vehicle BMS may be associated with a remote computing system or server, and/or may be associated with a different vehicle or mobile computing device. Further, an aerial vehicle control system, potentially in communication with another control system, may determine to send battery parameter data to an off-vehicle BMS.

The process 500 may continue by selecting an off-vehicle BMS to which to send the battery parameter data, as at 504. For example, a plurality of off-vehicle BMS may be available and in communication with the vehicle via a network. The plurality of off-vehicle BMS may include various types, classes, complexity, versions, implementations, or other variations of algorithms, models, and/or estimators to process the battery parameter data. One or more of the plurality of off-vehicle BMS may be selected to receive and process the battery parameter data in order to corroborate or support an on-vehicle BMS. Further, an aerial vehicle control system, potentially in communication with another control system, may select an off-vehicle BMS to which to send the battery parameter data.

The process 500 may proceed by sending the battery parameter data to the selected off-vehicle BMS, as at 506. For example, the data associated with battery parameters may be sent to the selected off-vehicle BMS via a network, using wired or wireless communications, to process the data associated with battery parameters and determine one or more figures of merit of the battery using associated algorithms, models, and/or estimators. Further, an aerial vehicle control system, potentially in communication with another control system, may cause transfer of the battery parameter data to the selected off-vehicle BMS via a network.

The process 500 may then continue to receive a battery state determination from the off-vehicle BMS, as at 508. For example, the off-vehicle BMS may receive and process the data associated with battery parameters, using associated algorithms, models, and/or estimators, to determine one or more figures of merit of the battery. The figures of merit may comprise state of charge, state of health, state of power, and/or other figures. Further, an aerial vehicle control system, potentially in communication with another control system, may cause transfer by the off-vehicle BMS, and receipt by the aerial vehicle, of the battery state determination from the selected off-vehicle BMS via a network.

The process 500 may then proceed to process the battery state determination from the off-vehicle BMS with an on-vehicle BMS battery state determination, as at 510. For example, the battery state determination from the selected off-vehicle BMS may be processed together with the battery state determination from the on-vehicle BMS. As described herein, various methods may be used to process the plurality of battery state determinations, including a most conservative approach, removal of outliers from the data, applying weightings to the data, and/or various other calculations, processes, or methods. Further, an aerial vehicle control system, potentially in communication with another control system, may process the battery state determination from the selected off-vehicle BMS with the battery state determination from the on-vehicle BMS.

The process 500 may continue with determining a battery state based on the determinations from the off-vehicle BMS and the on-vehicle BMS, as at 512. For example, based on the processing of respective battery state determinations from the selected off-vehicle BMS and the on-vehicle BMS, a battery state may be determined for the battery of the vehicle. The battery state may relate to a state of charge, state of health, state of power, and/or other figures of merit. Further, an aerial vehicle control system, potentially in communication with another control system, may determine the battery state based on respective battery state determinations from the selected off-vehicle BMS and the on-vehicle BMS.

The process 500 may proceed with controlling the vehicle based on the determined battery state, as at 514. For example, based on the determined state of charge, state of health, state of power, and/or other figures of merit, various operations or functions of the vehicle may be instructed or commanded as a result. Further, an aerial vehicle control system, potentially in communication with another control system, may instruct or command various operations or functions of the vehicle based on the determined battery state.

The process 500 may then end, as at 516.

Figure 6:
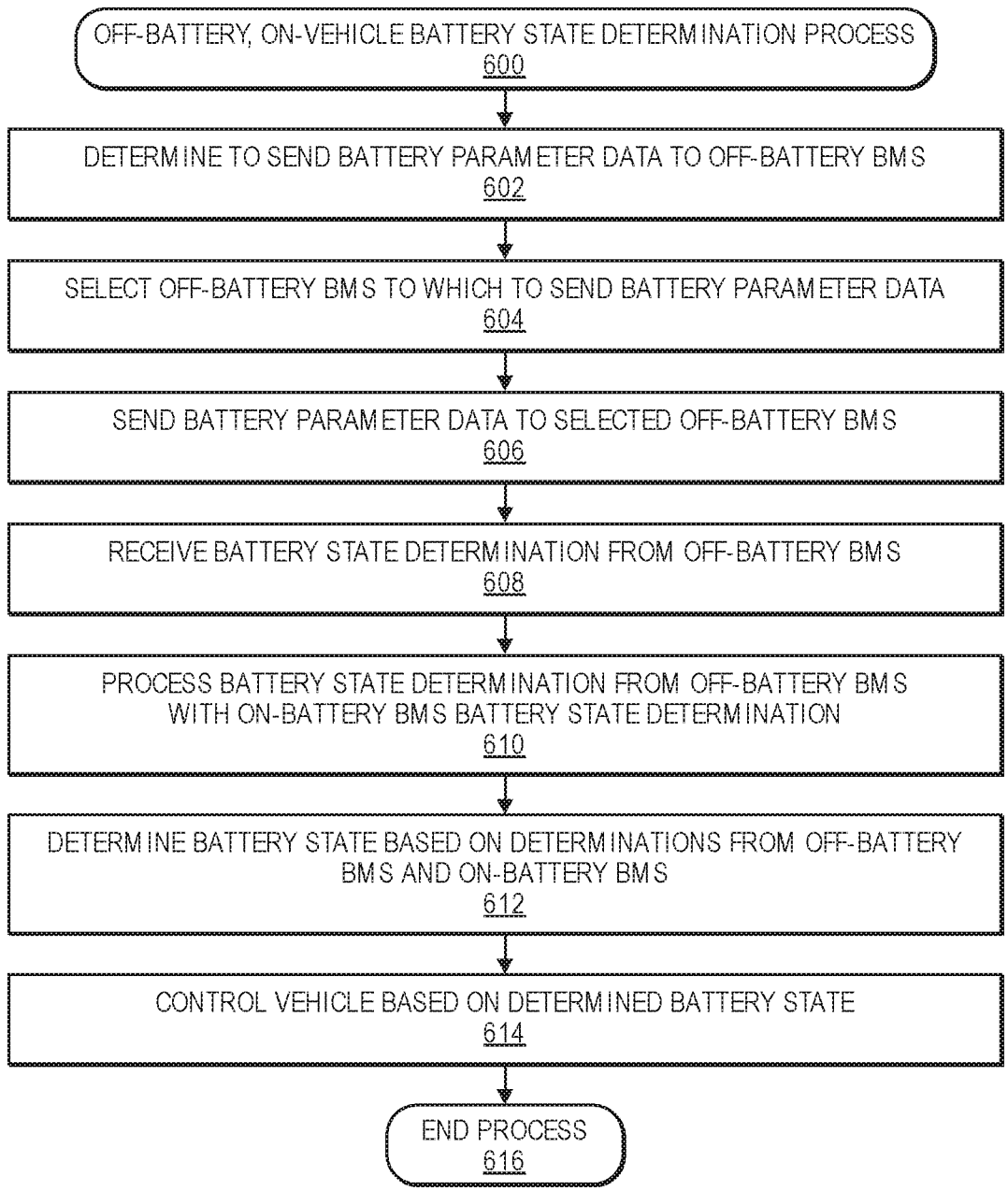
FIG. 6 is a flow diagram illustrating an example off-battery, on-vehicle battery state determination process, in accordance with implementations of the present disclosure.

FIG. 6 is a flow diagram illustrating an example off-battery, on-vehicle battery state determination process 600, in accordance with implementations of the present disclosure.

The process 600 may begin by determining to send battery parameter data to an off-battery BMS, as at 602. For example, various data associated with battery parameters, such as data associated with voltage, current, resistance, temperature, dimensions, or other parameters, may be sent or transmitted to one or more off-battery BMS via an interface, bus, or network. The off-battery BMS may be associated with a separate subsystem or component, or portion thereof, of the vehicle. Further, an aerial vehicle control system, potentially in communication with another control system, may determine to send battery parameter data to an off-battery BMS.

The process 600 may continue by selecting an off-battery BMS to which to send the battery parameter data, as at 604. For example, a plurality of off-battery BMS may be available and in communication with the vehicle via a network. The plurality of off-battery BMS may include various types, classes, complexity, versions, implementations, or other variations of algorithms, models, and/or estimators to process the battery parameter data. One or more of the plurality of off-battery BMS may be selected to receive and process the battery parameter data in order to corroborate or support an on-battery BMS. Further, an aerial vehicle control system, potentially in communication with another control system, may select an off-battery BMS to which to send the battery parameter data.

The process 600 may proceed by sending the battery parameter data to the selected off-battery BMS, as at 606. For example, the data associated with battery parameters may be sent to the selected off-battery BMS via an interface, bus, or network, using wired or wireless communications, to process the data associated with battery parameters and determine one or more figures of merit of the battery using associated algorithms, models, and/or estimators. Further, an aerial vehicle control system, potentially in communication with another control system, may cause transfer of the battery parameter data to the selected off-battery BMS via an interface, bus, or network.

The process 600 may then continue to receive a battery state determination from the off-battery BMS, as at 608. For example, the off-battery BMS may receive and process the data associated with battery parameters, using associated algorithms, models, and/or estimators, to determine one or more figures of merit of the battery. The figures of merit may comprise state of charge, state of health, state of power, and/or other figures. Further, an aerial vehicle control system, potentially in communication with another control system, may cause transfer by the off-battery BMS, and receipt by the aerial vehicle control system, of the battery state determination from the selected off-battery BMS via an interface, bus, or network.

The process 600 may then proceed to process the battery state determination from the off-battery BMS with an on-battery BMS battery state determination, as at 610. For example, the battery state determination from the selected off-battery BMS may be processed together with the battery state determination from the on-battery BMS. As described herein, various methods may be used to process the plurality of battery state determinations, including a most conservative approach, removal of outliers from the data, applying weightings to the data, and/or various other calculations, processes, or methods. Further, an aerial vehicle control system, potentially in communication with another control system, may process the battery state determination from the selected off-battery BMS with the battery state determination from the on-battery BMS.

The process 600 may continue with determining a battery state based on the determinations from the off-battery BMS and the on-battery BMS, as at 612. For example, based on the processing of respective battery state determinations from the selected off-battery BMS and the on-battery BMS, a battery state may be determined for the battery of the vehicle. The battery state may relate to a state of charge, state of health, state of power, and/or other figures of merit. Further, an aerial vehicle control system, potentially in communication with another control system, may determine the battery state based on respective battery state determinations from the selected off-battery BMS and the on-battery BMS.

The process 600 may proceed with controlling the vehicle based on the determined battery state, as at 614. For example, based on the determined state of charge, state of health, state of power, and/or other figures of merit, various operations or functions of the vehicle may be instructed or commanded as a result. Further, an aerial vehicle control system, potentially in communication with another control system, may instruct or command various operations or functions of the vehicle based on the determined battery state.

The process 600 may then end, as at 616.

Figure 7:
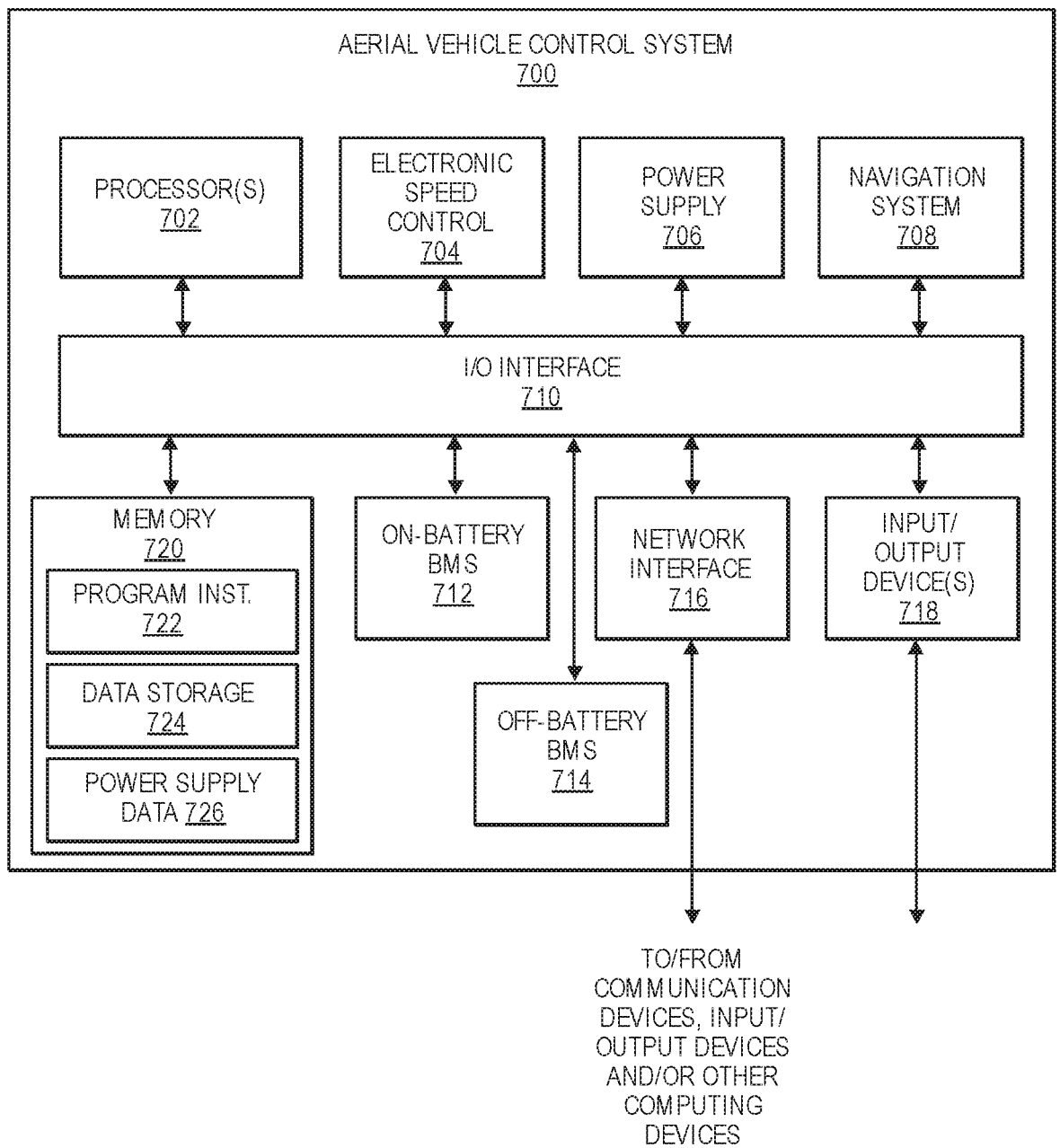
FIG. 7 is a block diagram illustrating various components of an example aerial vehicle control system, in accordance with disclosed implementations.

FIG. 7 is a block diagram illustrating various components of an aerial vehicle control system or controller 700, in accordance with disclosed implementations. The aerial vehicle control system 700 may comprise an example implementation of the aerial vehicle control system 110 schematically illustrated in FIG. 1.

In various examples, the block diagram may be illustrative of one or more aspects of the aerial vehicle control system 700 that may be used to implement the various systems and processes discussed above. Although described with reference to an aerial vehicle, all or portions of the components described herein may form a control system or controller 700 for any other vehicle, system, machine, apparatus, device, instrument, or object in which the various systems and corresponding methods described herein may be implemented.

In the illustrated implementation, the aerial vehicle control system 700 includes one or more processors 702, coupled to a non-transitory computer readable storage medium 720 via an input/output (I/O) interface 710. The aerial vehicle control system 700 may also include an electronic speed controller 704, a power supply or battery 706, and/or a navigation system 708. The aerial vehicle control system 700 may further include an on-battery BMS 712, one or more off-battery BMS 714, a network interface 716, and one or more input/output devices 718.

In various implementations, the aerial vehicle control system 700 may be a uniprocessor system including one processor 702, or a multiprocessor system including several processors 702 (e.g., two, four, eight, or another suitable number). The processor(s) 702 may be any suitable processor capable of executing instructions, For example, in various implementations, the processor(s) 702 may be general-purpose or embedded processors implementing any of a variety of instruction set architectures (ISAs), such as the x86, PowerPC, SPARC, ARM, or MIPS ISAs, or any other suitable ISA. In multiprocessor systems, each processor(s) 702 may commonly, but not necessarily, implement the same ISA.

The non-transitory computer readable storage medium 720 may be configured to store executable instructions, data, and power supply or battery data and/or characteristics, including battery parameter data, on-battery BMS data, off-battery BMS data, algorithms, models, and/or estimators, battery figures of merit, historical battery data, aerial vehicle data, flight or mission data, and/or other data items accessible by the processor(s) 702. In various implementations, the non-transitory computer readable storage medium 720 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions, such as those described above, are shown stored within the non-transitory computer readable storage medium 720 as program instructions 722, data storage 724 and power supply data 726, respectively. In other implementations, program instructions, data and/or power supply data may be received, sent, or stored upon different types of computer-accessible media, such as non-transitory media, or on similar media separate from the non-transitory computer readable storage medium 720 or the aerial vehicle control system 700.

Generally, a non-transitory, computer readable storage medium may include storage media or memory media such as magnetic or optical media, e.g., disk or CD/MID-ROM, coupled to the aerial vehicle control system 700 via the I/O interface 710. Program instructions and data stored via a non-transitory computer readable medium may be transmitted by transmission media or signals, such as electrical, electromagnetic, or digital signals, which may be conveyed via a communication medium such as a network and/or a wireless link, such as may be implemented via the network interface 716.

In one implementation, the I/O interface 710 may be configured to coordinate I/O traffic between the processor(s) 702, the non-transitory computer readable storage medium 720, and any peripheral devices, the network interface 716 or other peripheral interfaces, such as input/output devices 718. In some implementations, the I/O interface 710 may perform any necessary protocol, timing or other data transformations to convert data signals from one component (e.g., non-transitory computer readable storage medium 720) into a format suitable for use by another component (e.g., processor(s) 702). In some implementations, the I/O interface 710 may include support for devices attached through various types of peripheral buses, such as a variant of the Peripheral Component Interconnect (PCI) bus standard or the Universal Serial Bus (USB) standard, for example. In some implementations, the function of the I/O interface 710 may be split into two or more separate components, such as a north bridge and a south bridge, for example. Also, in some implementations, some or all of the functionality of the I/O interface 710, such as an interface to the non-transitory computer readable storage medium 720, may be incorporated directly into the processor(s) 702.

The electronic speed control 704 communicates with the navigation system 708 and adjusts the operational characteristics of each propulsion mechanism to guide the aerial vehicle along a determined path and/or to perform other navigational maneuvers. The navigation system 708 may include a GPS or other similar system than can be used to navigate the aerial vehicle to and/or from a location.

The aerial vehicle control system 700 may also include an on-battery BMS 712 that communicates with the processor(s) 702, the non-transitory computer readable storage medium 720, various sensors, and/or other subsystems or components to monitor states of charge, health, and/or power of the power supply 706, as discussed herein.

The aerial vehicle control system 700 may also include one or more off-battery BMS 714 that communicates with the processor(s) 702, the non-transitory computer readable storage medium 720, the on-battery BMS 712, various sensors, and/or other subsystems or components to monitor states of charge, health, and/or power of the power supply 706, as discussed herein. In various example embodiments, one or more off-battery BMS 714 may be associated with other subsystems or components of the aerial vehicle that are separate or distinct from the aerial vehicle control system 700 and that are in communication with the aerial vehicle control system 700.

The network interface 716 may be configured to allow data to be exchanged between the aerial vehicle control system 700, other devices attached to a network, such as other remote computing systems or servers, and/or control systems of other vehicles, systems, machines, apparatuses, instruments, devices, or objects, including one or more off-vehicle, remote BMS as described herein. For example, the network interface 716 may enable wireless communication between numerous aerial vehicles. In various implementations, the network interface 716 may support communication via wired or wireless general data networks, such as a Wi-Fi network. For example, the network interface 716 may support communication via telecommunications networks such as cellular communication networks, satellite networks, and the like.

Input/output devices 718 may, in some implementations, include one or more displays, various sensors, image capture devices, thermal sensors, infrared sensors, time of flight sensors, accelerometers, pressure sensors, weather sensors, etc. Multiple input/output devices 718 may be present and controlled by the aerial vehicle control system 700. One or more of the various sensors may be utilized to assist in monitoring the states of charge, health, and/or power of the power supply.

As shown in FIG. 7, the memory may include program instructions 722 which may be configured to implement the example processes and/or sub-processes described above. The data storage 724 and/or the power supply data 726 may include various data stores for maintaining data items that may be provided for monitoring states of charge, health, and/or power of the power supply. For example, the data storage 724 and/or the power supply data 726 may include battery parameter data, on-battery BMS data, off-battery BMS data, algorithms, models, and/or estimators, battery figures of merit, historical battery data, aerial vehicle data, flight or mission data, and/or other data items.

The data storage 724 and/or the power supply data 726 may also include any data related to material, chemical, thermal, electrical, and/or physical properties, operational characteristics, states of charge, states of health, states of power, ideal specifications, historical data related to any of the properties and/or characteristics, dimensional data, temperature data, and/or other data related to the power supply and/or individual cells of the power supply.

Figure 8:
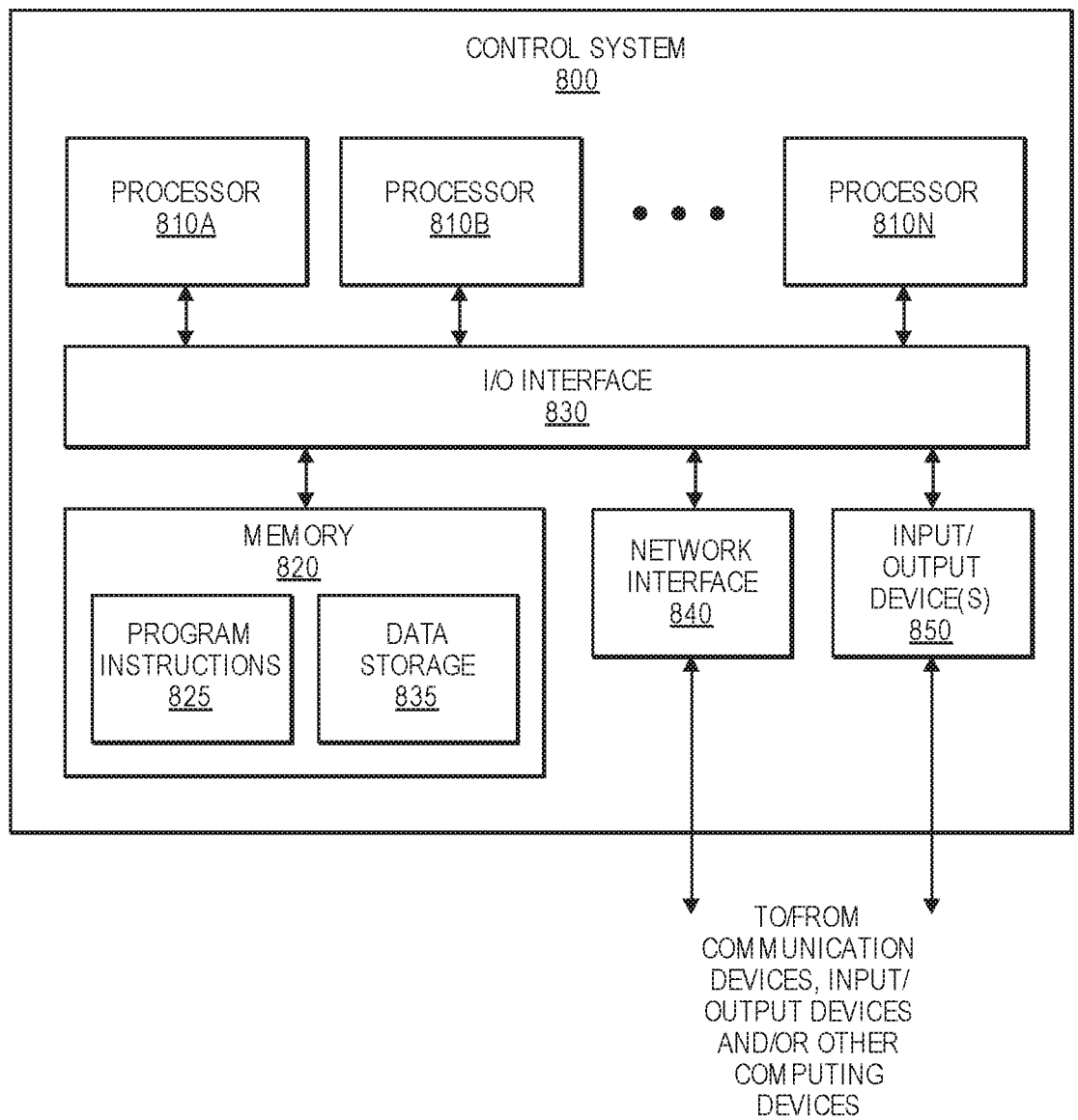
FIG. 8 is a block diagram illustrating various components of an example control system, in accordance with disclosed implementations.

FIG. 8 is a block diagram illustrating various components of an example control system 800, in accordance with disclosed implementations. The control system 800 may be in communication with the aerial vehicle control systems 110, 700 of FIGS. 1 and 7. In various example embodiments, one or more off-vehicle, remote BMS may be associated with example control systems 800 that are separate or distinct from the aerial vehicle control system 700 and that are in communication with the aerial vehicle control system 700 of the aerial vehicle.

Various operations of a control system, such as those described herein, may be executed on one or more computer systems, and/or interacting with various other computers, systems, or devices associated with a facility, warehouse, building, vehicle, mobile computing device, electronic device, or connected device, according to various implementations. For example, the control system discussed above may function and operate on one or more computer systems. One such control system is illustrated by the block diagram in FIG. 8. In the illustrated implementation, a control system 800 includes one or more processors 810A, 810B through 810N, coupled to a non-transitory computer-readable storage medium 820 via an input/output (I/O) interface 830. The control system 800 further includes a network interface 840 coupled to the I/O interface 830, and one or more input/output devices 850. In some implementations, it is contemplated that a described implementation may be implemented using a single instance of the control system 800 while, in other implementations, multiple such systems or multiple nodes making up the control system 800 may be configured to host different portions or instances of the described implementations. For example, in one implementation, some data sources or services (e.g., related to portions of redundant battery management systems, etc. may be implemented via one or more nodes of the control system 800 that are distinct from those nodes implementing other data sources or services (e.g., related to other portions of redundant battery management systems, etc.).

In various implementations, the control system 800 may be a uniprocessor system including one processor 810A, or a multiprocessor system including several processors 810A-810N (e.g., two, four, eight, or another suitable number). The processors 810A-810N may be any suitable processor capable of executing instructions. For example, in various implementations, the processors 810A-810N may be general-purpose or embedded processors implementing any of a variety of instruction set architectures (ISAs), such as the x86, PowerPC, SPARC, ARM, or MIPS ISAs, or any other suitable ISA. In multiprocessor systems, each of the processors 810A-810N may commonly, but not necessarily, implement the same ISA.

The non-transitory computer-readable storage medium 820 may be configured to store executable instructions and/or data accessible by the one or more processors 810-810N. In various implementations, the non-transitory computer-readable storage medium 820 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions and/or processes, such as those described above, are shown stored within the non-transitory computer-readable storage medium 820 as program instructions 825 and data storage 835, respectively. In other implementations, program instructions and/or data may be received, sent, or stored upon different types of computer-accessible media, such as non-transitory media, or on similar media separate from the non-transitory computer-readable storage medium 820 or the control system 800. Generally speaking, a non-transitory, computer-readable storage medium may include storage media or memory media such as magnetic or optical media, e.g., disk or CD/DVD-ROM, coupled to the control system 800 via the I/O interface 830. Program instructions and data stored via a non-transitory computer-readable medium may be transmitted by transmission media or signals such as electrical, electromagnetic, or digital signals, which may be conveyed via a communication medium such as a network and/or a wireless link, such as may be implemented via the network interface 840.

In one implementation, the I/O interface 830 may be configured to coordinate I/O traffic between the processors 810A-810N, the non-transitory computer-readable storage medium 820, and any peripheral devices, including the network interface 840 or other peripheral interfaces, such as input/output devices 850. In some implementations, the I/O interface 830 may perform any necessary protocol, timing or other data transformations to convert data signals from one component (e.g., non-transitory computer-readable storage medium 820) into a format suitable for use by another component (e.g., processors 810A-810N). In some implementations, the I/O interface 830 may include support for devices attached through various types of peripheral buses, such as a variant of the Peripheral Component Interconnect (PCI) bus standard or the Universal Serial Bus (USB) standard, for example. In some implementations, the function of the I/O interface 830 may be split into two or more separate components, such as a north bridge and a south bridge, for example. Also, in some implementations, some or all of the functionality of the I/O interface 830, such as an interface to the non-transitory computer-readable storage medium 820, may be incorporated directly into the processors 810A-810N.

The network interface 840 may be configured to allow data to be exchanged between the control system 800 and other devices attached to a network, such as other control systems, computing systems or servers, aerial vehicle control systems, other systems, machines, apparatus, instruments, devices, or objects, or between nodes of the control system 800. In various implementations, the network interface 840 may support communication via wired or wireless general data networks, such as any suitable type of network. For example, the network interface 840 may support communication via telecommunications networks such as cellular communication networks, satellite networks, and the like.

Input/output devices 850 may, in some implementations, include one or more displays, projection devices, audio input/output devices, keyboards, keypads, touchpads, scanning devices, imaging devices, sensors, proximity sensors, RFID readers, voice or optical recognition devices, or any other devices suitable for entering or retrieving data by one or more control systems 800. Multiple input/output devices 850 may be present in the control system 800 or may be distributed on various nodes of the control system 800. In some implementations, similar input/output devices may be separate from the control system 800 and may interact with one or more nodes of the control system 800 through a wired or wireless connection, such as over the network interface 840.

As shown in FIG. 8, the memory 820 may include program instructions 825 that may be configured to implement one or more of the described implementations and/or provide data storage 835, which may comprise various tables, data stores and/or other data structures accessible by the program instructions 825. The program instructions 825 may include various executable instructions, programs, or applications to facilitate redundant battery management systems, remote or off-vehicle BMS operations or functions, communications with on-vehicle BMS or other off-vehicle BMS, or other processes. The data storage 835 may include various data stores for maintaining data related to battery parameter data, on-vehicle BMS data, off-vehicle BMS data, algorithms, models, and/or estimators, battery figures of merit, historical battery data, data related to material, chemical, thermal, electrical, and/or physical properties, operational characteristics, ideal specifications, historical data related to any of the properties and/or characteristics, dimensional data, temperature data, other data related to the power supply and/or individual cells of the power supply, aerial vehicle data, flight or mission data, and/or other data items.

Those skilled in the art will appreciate that the control system 800 is merely illustrative and is not intended to limit the scope of implementations. In particular, the control system and devices may include any combination of hardware or software that can perform the indicated functions, including computers, network devices, internet appliances, robotic devices, etc. The control system 800 may also be connected to other devices that are not illustrated, or instead may operate as a stand-alone system. In addition, the functionality provided by the illustrated components may in some implementations be combined in fewer components or distributed in additional components. Similarly, in some implementations, the functionality of some of the illustrated components may not be provided and/or other additional functionality may be available.

It should be understood that, unless otherwise explicitly or implicitly indicated herein, any of the features, characteristics, alternatives or modifications described regarding a particular implementation herein may also be applied, used, or incorporated with any other implementation described herein, and that the drawings and detailed description of the present disclosure are intended to cover all modifications, equivalents and alternatives to the various implementations as defined by the appended claims. Moreover, with respect to the one or more methods or processes of the present disclosure described herein, including but not limited to the flow charts shown in FIGS. 5-6, orders in which such methods or processes are presented are not intended to be construed as any limitation on the claimed inventions, and any number of the method or process steps or boxes described herein can be omitted, reordered, or combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

The elements of a method, process, or algorithm described in connection with the implementations disclosed herein can be embodied directly in hardware, in a software module stored in one or more memory devices and executed by one or more processors, or in a combination of the two.

A software module can reside in RAM, flash memory, ROM, EPROM, EEPROM, registers, a hard disk, a removable disk, a CD ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC, The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount, Although the invention has been described and illustrated with respect to illustrative implementations thereof, the foregoing and various other additions and omissions may be made therein and thereto without departing from the spirit and scope of the present disclosure.

What is claimed is:

1. A method, comprising:
   selecting, by a controller, an off-battery battery management system (BMS) to which to transmit parameter data associated with a battery of a system;
   transmitting, by the controller, the parameter data to the selected off-battery BMS;
   receiving, by the controller, an off-battery battery state determination from the selected off-battery BMS;
   receiving, by the controller, an on-battery battery state determination from an on-battery BMS:
   determining, by the controller, a battery state based at least in part on the off-battery battery state determination and the on-battery battery state determination; and
   causing operation, by the controller, of the system based at least in part on the determined battery state.

2. The method of claim 1, further comprising:
   receiving, by the controller, the parameter data associated with the battery of the system.

3. The method of claim 1, wherein the off-battery BMS is selected from a plurality of off-battery BMS;
wherein individual ones of the plurality of off-battery BMS are at least one of physically separate from the on-battery BMS or physically separate from the system.

4. The method of claim 1, wherein the on-battery BMS comprises a first algorithm to calculate the on-battery battery state determination; and
wherein the off-battery BMS comprises a second algorithm to calculate the off-battery battery state determination.

5. The method of claim 4, wherein the second algorithm is different from the first algorithm.

6. The method of claim 4, wherein the second algorithm is of a different type or class than the first algorithm.

7. The method of claim 4, wherein the first algorithm is less computationally intensive than the second algorithm.

8. The method of claim 4, wherein each of the first algorithm and the second algorithm comprises at least one of an electrical model, a physics-based model, a look-up table, a linear regression model, a decision tree, a neural network model, a Kalman-filter based estimator, an extended Kalman-filter based estimator, or a particle filter-based estimator.

9. The method of claim 1, wherein the parameter data comprises at least one of a current, a voltage, or a temperature associated with the battery; and
wherein the battery state comprises at least one of a state of charge, a state of health, or a state of power associated with the battery.

10. The method of claim 1, wherein determining the battery state based at least in part on the off-battery battery state determination and the on-battery battery state determination further comprises at least one of:
selecting a more conservative one of the off-battery battery state determination or the on-battery battery state determination to determine the battery state;
processing the off-battery battery state determination and the on-battery battery state determination to calculate at least one of a mean, median, or mode to determine the battery state;
disregarding at least one outlier among the off-battery battery state determination and the on-battery battery state determination to determine the battery state; or
determining at least one weight associated with the off-battery battery state determination and the on-battery battery state determination to determine the battery state.

11. An aerial vehicle, comprising:
a body;
at least one propulsion mechanism;
a battery having an associated on-battery battery management system (BMS), the on-battery BMS configured to calculate an on-battery battery state determination based at least in part on parameter data associated with the battery; and
a controller configured to at least:
select an off-battery BMS to which to transmit parameter data;
transmit the parameter data to the selected off-battery BMS;
receive an off-battery battery state determination from the selected off-battery BMS;
receive the on-battery battery state determination from the on-battery BMS;
determine a battery state based at least in part on the off-battery battery state determination and the on-battery battery state determination; and
cause operation of the aerial vehicle based at least in part on the determined battery state.

12. The aerial vehicle of claim 11, wherein the off-battery BMS is associated with a computing system remote from the aerial vehicle.

13. The aerial vehicle of claim 11, further comprising:
at least one component on-board the aerial vehicle and physically separate from the battery;
wherein the off-battery BMS is associated with the at least one component.

14. The aerial vehicle of claim 13, wherein the off-battery BMS associated with the at least one component comprises a second instance of the on-battery BMS that is physically separate from the on-battery BMS.

15. The aerial vehicle of claim 11, wherein the on-battery BMS comprises a first model, and the off-battery BMS comprises a second model;
wherein the first model comprises a different type or class than the second model.

16. A computer-implemented method to monitor a battery of a vehicle, comprising:
receiving, by a controller, parameter data associated with the battery;
determining, by the controller, to transmit the parameter data to at least one of a plurality of off-battery battery management systems (BMS);
selecting, by the controller, an off-battery BMS to which to transmit the parameter data;
transmitting, by the controller, the parameter data to the selected off-battery BMS;
receiving, by the controller, an off-battery battery state determination from the selected off-battery BMS;
receiving, by the controller, an on-battery battery state determination from an on-battery BMS:
processing, by the controller, the off-battery battery state determination with the on-battery battery state determination;
determining, by the controller, a battery state based at least in part on the off-battery battery state determination and the on-battery battery state determination; and
causing operation, by the controller, of the vehicle based at least in part on the determined battery state.

17. The computer-implemented method of claim 16, wherein the parameter data comprises at least one of a current, a voltage, or a temperature associated with the battery.

18. The computer-implemented method of claim 16, wherein the battery state comprises at least one of a state of charge, a state of health, or a state of power associated with the battery.

19. The computer-implemented method of claim 16, wherein the on-battery BMS is associated with the battery of the vehicle.

20. The computer-implemented method of claim 16, wherein the off-battery BMS is associated with a computing system that is at least one of physically separate from the on-battery BMS or remote from the vehicle.

* * * * *